(12) United States Patent
Kirsch et al.

(10) Patent No.: US 12,084,172 B2
(45) Date of Patent: Sep. 10, 2024

(54) METHOD FOR OPERATING AN AIRCRAFT, CONTROL ARCHITECTURE FOR AN AIRCRAFT, AND AIRCRAFT HAVING SAME

(71) Applicant: Volocopter GmbH, Bruchsal (DE)

(72) Inventors: Benjamin Kirsch, Heidelberg (DE); Falk Bahr, Karlsruhe (DE); Jan Zwiener, Waldbronn (DE); Alexander Klingspor, Karlsruhe (DE)

(73) Assignee: Volocopter GmbH, Bruchsal (DE)

( * ) Notice: Subject to any disclaimer, the term of this patent is extended or adjusted under 35 U.S.C. 154(b) by 316 days.

(21) Appl. No.: 17/482,600

(22) Filed: Sep. 23, 2021

(65) Prior Publication Data

US 2022/0089274 A1    Mar. 24, 2022

(30) Foreign Application Priority Data

Sep. 23, 2020  (DE) .......................... 102020124731.1

(51) Int. Cl.
  *B64C 27/08*    (2023.01)
  *B64D 27/24*    (2024.01)
  *B64D 31/06*    (2024.01)

(52) U.S. Cl.
  CPC .............. *B64C 27/08* (2013.01); *B64D 27/24* (2013.01); *B64D 31/06* (2013.01)

(58) Field of Classification Search
  CPC ............ G05B 9/03; G05B 2219/24175; G05B 2219/24177; G05D 1/87; G05D 1/0808;
  (Continued)

(56) References Cited

U.S. PATENT DOCUMENTS

| | | | |
|---|---|---|---|
| 8,127,180 B2 * | 2/2012 | Baleani | ..................... H04L 1/22 |
| | | | 714/48 |
| 9,977,432 B1 | 5/2018 | Cutler et al. | |

(Continued)

FOREIGN PATENT DOCUMENTS

| | | |
|---|---|---|
| DE | 3240814 | 5/1983 |
| DE | 69629828 | 7/2004 |

(Continued)

OTHER PUBLICATIONS

Source: https://commons.wikimedia.org/w/index.php?curid=15255821), 2 pages.

(Continued)

*Primary Examiner* — Jason H Duger
(74) *Attorney, Agent, or Firm* — FIG. 1 Patents

(57) ABSTRACT

A method for operating an eVTOL multirotor aircraft having distributed actuators activated by controllers that each determines an associated manipulated variable signal at least for a subset of actuators and provides it for the relevant actuator. The method provides that for an actuator: i) assigning a different priority ranking for each controller; ii) determining, by way of a given controller having a given priority ranking, at least one manipulated variable signal for the actuator and transmitting the signal identified by the given priority ranking to the relevant actuator and to a controller having a successive priority ranking; iii) receiving, via a given controller having a given priority ranking, manipulated variable signals from controllers having higher priority ranking and relaying these signals to the actuator and to a controller having a successive priority ranking; and iv) activating the actuator using the manipulated variable signal identified by the highest priority ranking.

12 Claims, 2 Drawing Sheets

(58) Field of Classification Search
CPC ........ G05D 17/02; B64C 27/08; B64C 27/14; B64C 13/02; B64D 27/24; B64D 31/06; B64D 35/02; B64D 31/00; B64U 10/20; H05L 1/22; G06F 11/1608

See application file for complete search history.

(56) References Cited

U.S. PATENT DOCUMENTS

| | | | |
|---|---|---|---|
| 2008/0179959 A1* | 7/2008 | Folken | H02J 3/38 |
| | | | 307/80 |
| 2012/0192147 A1* | 7/2012 | Wong | G06F 9/48 |
| | | | 717/106 |
| 2014/0100718 A1* | 4/2014 | Brot | B64C 1/00 |
| | | | 701/3 |
| 2015/0103735 A1* | 4/2015 | Bobrek | H04L 47/10 |
| | | | 370/316 |
| 2015/0212523 A1* | 7/2015 | Wolf | G05D 1/0088 |
| | | | 701/5 |
| 2017/0067530 A1 | 3/2017 | Swanson | |
| 2018/0099739 A1 | 4/2018 | Salesse-Lauergne et al. | |
| 2019/0031331 A1 | 1/2019 | McCullough et al. | |
| 2019/0068089 A1 | 2/2019 | Saito | |
| 2019/0071172 A1 | 3/2019 | Caldwell | |
| 2019/0168867 A1 | 6/2019 | Hartmann et al. | |
| 2019/0291862 A1 | 9/2019 | Lyasoff et al. | |
| 2020/0262543 A1 | 8/2020 | Mueller et al. | |
| 2021/0171187 A1* | 6/2021 | Keir | G05D 1/0077 |
| 2023/0322366 A1* | 10/2023 | De Castro Paiva | G05D 1/0077 |
| | | | 701/3 |

FOREIGN PATENT DOCUMENTS

| | | |
|---|---|---|
| DE | 60101928 | 1/2005 |
| DE | 69814971 | 12/2013 |
| DE | 102008022895 | 5/2017 |
| DE | 102016115485 | 2/2018 |
| EP | 2543589 | 1/2013 |
| JP | 2019161714 | 9/2019 |

OTHER PUBLICATIONS

Jihui et al., "Technology for High Altitude and Long Endurance UAV Flight Controllers", Journal of Northwestern Polytechnical University, vol. 36, No. 4, 7 pages, Aug. 15, 2018.

Jihui et al., "Fault Diagnosis and Adaptive Reconfiguration for Multi-Redundancy Flight Control System", Computerized Measurement and Control, 5 pages, Apr. 25, 2015.

* cited by examiner

METHOD FOR OPERATING AN AIRCRAFT, CONTROL ARCHITECTURE FOR AN AIRCRAFT, AND AIRCRAFT HAVING SAME

INCORPORATION BY REFERENCE

The following documents are incorporated herein by reference as if fully set forth: German Patent Application No. 10 2020 124 731.1, filed Sep. 23, 2020.

TECHNICAL FIELD

The invention relates to a method for operating an aircraft, in particular an electrically driven, vertical takeoff and landing multirotor aircraft, having multiple distributed actuators, in particular in the form of drive units, in which the actuators are activated by a plurality of controllers, wherein each controller determines an associated manipulated variable signal at least for a subset of actuators, preferably for all actuators, and provides it for the relevant actuator.

The invention furthermore relates to a control architecture for an aircraft, in particular for an electrically driven, vertical takeoff and landing multirotor aircraft, having multiple distributed actuators, in particular in the form of drive units, in which a plurality of controllers are provided for activating the actuators, wherein each controller is designed to determine an associated manipulated variable signal at least for a subset of actuators, preferably for all actuators, and provide it for the relevant actuator.

Finally, the invention also relates to an aircraft, in particular an electrically driven, vertical takeoff and landing multirotor aircraft, having multiple distributed actuators, in particular in the form of drive units, and having a plurality of controllers for activating the actuators, wherein each controller is designed to determine an associated manipulated variable signal at least for a subset of actuators, preferably for all actuators, and provide it for the relevant actuator.

BACKGROUND

In particular in the field of aviation, thus in the operation of aircraft, redundancies in critical systems are necessary to ensure safe operation and comply with the fundamental licensing regulations. In the case of control-engineering tasks, four required components of the control exist in this context, which is fundamentally known to a person skilled in the art and is schematically shown in FIG. 1.

The mentioned components are the actual controller, the transmission of the manipulated variables output by the controller to the so-called controlled system, the controlled system itself (thus a corresponding actuator or a positioning element), and so-called feedback, which can be implemented, for example, by a sensor (in the case of sensor-based control) or a model (in the case of model-based control). The illustration in FIG. 1 graphically depicts the fundamental relationships as are entirely routine to a person skilled in the art for control engineering.

For the sake of simplicity, it is to be presumed hereinafter that the controller and the sensor or the model form a unit, which does not necessarily have to be the case, however.

If the redundancy mentioned above is implemented by a duplication of the controller and the corresponding transmission path between controller and controlled system, the question arises at the manipulated variable input of the actuator which of the manipulated variable signals arriving there (from the various, redundant controllers) is to be implemented. The problem is solved according to the prior art, inter alia, by the following approaches: voting, thus, for example, a fact-based selection, averaging, or command monitor approach.

A selection is not only required at the manipulated variable input of the actuator, however: Since most controllers having so-called integrative components are used in accordance with a chronological summation or integration of the control deviation, it is to be taken into consideration that these integrative components can grow continuously if the control variable (cf. FIG. 1) is not fed back in a sensor-based or sensor-free manner and the control loop is therefore not closed. In addition, it is to be taken into consideration that the sensors and controllers have inaccuracies or independencies. A controller which is not in the closed control loop cannot bring a measured (or modeled) error to zero, since it has no control over the aircraft. The remaining error thus adds up again and again.

An open control loop is also referred to hereinafter as an "open loop", while a closed control loop is referred to as a "closed loop". FIG. 1 shows a closed loop, that is to say a linearly controlling controller.

If a controller thus has items of information as to whether it is in a closed loop or an open loop, it can accordingly activate or deactivate the integration. To solve this problem, a feedback channel from the actuator to the controller could be provided in a simple manner, as shown in FIG. 1, for example. Such a feedback channel is also accompanied by potential further problems, however—especially in aviation—since it consumes resources, for example, weight, energy, and development effort, can fail in operation, or could transmit incorrect items of information.

For aviation applications, in general not only the controller is designed to be redundant, but also the actuators, to counteract the problem of the required feedback as outlined above. If an actuator receives a manipulated variable signal in such an embodiment, it can typically only originate from a specific source. If no manipulated variable signal is transmitted, the actuator does not act. This has the result that multiple actuators have to be used to fulfill the same object, which again causes costs in the form of weight, power consumption, and development expenditure. In particular the points weight and power consumption are to be assessed as particularly critical in the field of aviation. In addition, the approach outlined above results in an error dependency between controllers and actuators, so that a failure of a relevant controller results in a failure of the associated actuator.

The above-mentioned error dependency accordingly represents a significant disadvantage in aircraft. To avoid this, more actuators have to be installed than would be the case if the mentioned dependency did not exist. This is considered to be disadvantageous for weight reasons alone.

In particular in the case of electrically driven vertical takeoff and landing aircraft, so-called eVTOLs, in which the actuators consist of electric drives which are connected directly to a rotor, which rotors generate the lift and are responsible for the position stabilization, a failure of one actuator or multiple actuators due to the failure of a controller is generally unacceptable. Even if multiple electric motors were provided to drive one rotor, the overall function of the unit made up of drive and rotor for generating thrust and torques for position stabilization would be significantly impaired.

It is therefore necessary for a highly redundant manipulated variable signal to be available at the electric drives in order to ensure functioning drives independently of the functioning of a controller or the transmission of items of information between controller and drives. In multirotor eVTOLs, the requirements for the independence from errors in the mentioned signal transmission are even strengthened for the following reasons:

Each controller is to be able to command (control) all drives (actuators) simultaneously;
the drives (actuators) are arranged spatially distributed;
in a Fly-by-Wire (FBW) system, electrical transmission lines can be impaired by magnetic fields; and
various controllers having authority over only a part of the drives (actuators) is to be avoided.

SUMMARY

There is a demand for a method for operating an aircraft and a control architecture for an aircraft which avoids the above-mentioned disadvantages and in particular solves the following problems at the same time: the problem of the complex selection of a controller in the case of redundant formation of the controllers; the problem of the error dependence of actuator and controller; the problem of the failure of individual communication paths; the problem of recognizing which controller is in a closed control loop; and the problem of failure in the event of a feedback channel being faulty.

To achieve this object, a method, a control architecture, and an aircraft having one or more of the features disclosed herein are provided.

Advantageous refinements of the concept according to the invention are defined and embodied below and in the claims.

A method according to the invention for operating an aircraft, in particular an electrically driven, vertical takeoff and landing multirotor aircraft, having multiple distributed actuators, in particular in the form of drive units, in which the actuators are activated by a plurality of controllers, wherein each controller determines an associated manipulated variable signal at least for a subset of actuators, preferably for all actuators, and provides it for the relevant actuator, includes the following steps for at least one actuator, preferably each actuator: i) assigning a priority ranking for each controller, which priority ranking is different from a priority ranking of each of the other controllers; ii) determining, by way of a given controller having a given priority ranking, at least one manipulated variable signal for the at least one actuator and transmitting the manipulated variable signal identified by the given priority ranking to the relevant actuator and to at least one controller having a successive priority ranking, in particular to the controller having a directly successive priority ranking; iii) receiving, by way of a given controller having a given priority ranking, manipulated variable signals of controllers having higher priority ranking and relaying these manipulated variable signals to the at least one actuator and to at least one controller having a successive priority ranking, in particular to the controller having a directly successive priority ranking; iv) activating the at least one actuator using the manipulated variable signal which is identified by the highest priority ranking.

An alternative method according to the invention for operating an aircraft, in particular an electrically driven vertical takeoff and landing multirotor aircraft, having multiple distributed actuators, in particular in the form of drive units, in which the actuators are activated by a plurality of controllers, wherein each controller determines an associated manipulated variable signal at least for a subset of actuators, preferably for all actuators, and provides it for the relevant actuator, includes the following steps for at least one actuator, preferably each actuator: i) determining, by way of a given controller, at least one manipulated variable signal for the at least one actuator and transmitting the manipulated variable signal to the relevant actuator and to at least one further controller; ii) receiving, by way of a given controller, manipulated variable signals of other controllers and relaying these manipulated variable signals to the at least one actuator and to at least one further other controller; iii) collecting a plurality of manipulated variable signals at the at least one actuator; iv) activating the at least one actuator using a manipulated variable signal derived from the plurality of collected manipulated variable signals, which derived manipulated variable signal is preferably obtained by voting or averaging.

A control architecture according to the invention for an aircraft, in particular for an electrically driven vertical takeoff and landing multirotor aircraft, having multiple distributed actuators, in particular in the form of drive units, in which a plurality of controllers are provided for activating the actuators, wherein each controller is designed to determine an associated manipulated variable signal at least for a subset of actuators, preferably for all actuators, and provide it for the relevant actuator, comprises that a) a priority ranking is assigned to each controller, which priority ranking is different from a priority ranking of each of the other controllers; b) each controller has a signaling connection at least to a subset of actuators, preferably to all actuators; c) each controller is designed to generate a manipulated variable signal for a relevant actuator and to transmit the manipulated variable signal identified by its priority ranking to the relevant actuator and to at least one controller having a successive priority ranking, in particular to the controller having a directly successive priority ranking; d) each controller is designed to receive manipulated variable signals from controllers having higher priority ranking and to relay these manipulated variable signals to the relevant actuator and to at least one controller having a successive priority ranking, in particular to the controller having a directly successive priority ranking; e) each actuator is designed to select for its activation the manipulated variable signal which is identified by the highest priority ranking.

An alternative control architecture according to the invention for an aircraft, in particular for an electrically driven, vertical takeoff and landing multirotor aircraft, having multiple distributed actuators, in particular in the form of drive units, in which a plurality of controllers are provided for activating the actuators, wherein each controller is designed to determine an associated manipulated variable signal at least for a subset of actuators, preferably for all actuators, and to provide it for the relevant actuator, comprises that a) each controller has a signaling connection at least to a subset of actuators, preferably to all actuators; b) each controller is designed to generate a manipulated variable signal for a relevant actuator and to transmit the manipulated variable signal to the relevant actuator and to at least one other controller; c) each controller is designed to receive manipulated variable signals from other controllers and to relay these manipulated variable signals to the relevant actuator and to at least one further controller; d) each actuator is designed to collect a plurality of manipulated variable signals; e) each actuator is designed to generate a manipulated variable signal derived from the plurality of collected manipulated variable signals, which derived manipulated variable signal is preferably obtained by voting or averaging, for activating the relevant actuator.

Averaging may be known per se. In general, however, averaging is not performed here in the actuator—as in the present invention—but rather in that various actuators exert different forces. The actuator generally only receives one signal. For critical actuators, two signals (signal 1, signal 2) can also be applied, wherein the logic is then: accept signal 1 as long as it is present. If not, accept signal 2. Both signals frequently come from the same flight controller here (Actuator Control Electronics—ACE).

An aircraft according to the invention, in particular an electrically driven vertical takeoff and landing multirotor aircraft, having multiple distributed actuators, in particular in the form of drive units, and having a plurality of controllers for activating the actuators, wherein each controller is designed to determine an associated manipulated variable signal at least for a subset of actuators, preferably for all actuators, and to provide it for the relevant actuator, has a control architecture according to the invention.

The problem of the complex selection of a controller in the case of redundant formation of the controllers can accordingly be bypassed according to the invention by a simple selection logic which can be implemented in the form of a priority list. This corresponds to the above-mentioned priority ranking for each controller, wherein each controller receives a unique priority. In other words: The controllers are ranked according to their priority, ordered (or classified) from a controller having highest priority to a controller having the lowest priority. Subsequently, the manipulated variable signal can be selected for activating an actuator which assumes the highest position on the list, i.e., which originates from the controller having the highest priority. Of course, this view only takes into consideration those manipulated variable signals which were also received at the relevant actuator, because it can occur that the controller having the absolutely highest priority ranking has failed, so that the manipulated variable signal having the highest priority can originate from a controller which, viewed absolutely, does not have the highest possible priority ranking.

The problem of the error dependence of actuator and controller is solved according to the invention in that the failure of an actuator does not result in a failure of a controller, since this controller can still command (control) all other actuators connected to it without any restriction. The failure of a controller is compensated for by the other existing controllers, which can still command all actuators connected to them.

According to the invention, the failure of individual communication paths also no longer has a negative effect, since many redundant communication paths result due to the mentioned relaying of the manipulated variable signals from controllers having higher priority to controllers having lower priority. Thus, if individual communication paths should be impaired, the manipulated variable signal of a given controller is nonetheless received by the relevant actuator on another path. In this way, the failure of individual communication paths also cannot have the result that various controllers only control individual actuators.

The problem of recognizing which controller is in a closed control loop can also be solved by the proposed prioritization of the manipulated variable signals (according to the priority rankings of the controllers). Due to the mentioned prioritization, each controller knows whether it is in an open (open loop) or a closed (closed loop) control loop: If the manipulated variable signal of all controllers having higher priority ranking does not appear, a given controller has to assume that it is in a closed control loop and can act accordingly, for example, by activating the mentioned integrative components.

The problem of the failure if the feedback channel is faulty is solved according to the invention in that in the specified method or the specified control architecture, no feedback channel is required at all. However, an (optional) feedback channel as a further information source can be used to indicate which redundancies have failed. Such an embodiment can be implemented as an advantageous refinement of the invention if necessary.

Due to the presence of multiple signal paths, the probability that all signals are impaired simultaneously is moreover reduced. In general, in conventional FBW systems there is one signal line to an actuator. A second signal path is only added in special cases (for very critical actuators). However, it is at least preferably proposed in the present case that at least as many signal paths as controllers be formed.

As already indicated above, the alternative implementation of the method according to the invention or the control architecture according to the invention manages without a prioritization or priority ranking as long as a manipulated variable signal which is derived from a plurality of collected manipulated variable signals, for example by voting or by averaging, preferably in the actuator, is used to activate the at least one actuator. Such an embodiment is somewhat more complex to implement than the proposed solution having priority ranking but achieves at least a majority of the positive properties specified in the scope of the present description.

A first refinement of the method according to the invention provides that controllers having integrative components, that is to say having chronological summing or integration of the control deviation are used, and a given controller activates or deactivates the integrative components in dependence on whether or not it receives manipulated variable signals from controllers having higher priority ranking. This particular advantage of the present invention was already indicated above. The controllers recognize in this way whether they are in an open loop or in a closed loop and can switch the integrative components on or off accordingly, which means a corresponding advantage in the control accuracy.

However, even without these integrative components, the method offers corresponding advantages if the controllers used do not have such components.

Another refinement of the method according to the invention provides that the priority ranking of the controllers is performed by a priority list, in which priority list the controllers are listed in the sequence of their priority ranking. This represents a special embodiment of the method, which has in practice proven to be particularly easily implementable and therefore advantageous. However, the invention is not restricted to the priority ranking of the controllers being performed by such a priority list.

As was already mentioned, in one refinement of the method according to the invention, it can be provided that in addition feedback about the reception of a manipulated variable signal takes place from a receiving controller to a transmitting controller via at least one optional feedback channel. In this way, items of information may advantageously be transmitted as to whether and which redundancies of the system have failed. However—as already stated—such an embodiment is optional, since the present invention also functions entirely without feedback channel.

A further other refinement of the method according to the invention provides that the manipulated variable signals are transmitted between the controllers and the actuators point-to-point between pairs of controllers or between controller and actuator or alternatively simultaneously to all receivers. In this way, various transmission options are available so that the method may be adapted suitably to corresponding requirements.

Still another refinement of the method according to the invention provides that at least a number of actuators, preferably all actuators, have a logic (selection logic or arbiter) connected upstream, which logic selects the manipulated variable signal to be used to activate the actuator or generates it in conjunction with the alternative embodiment of the method according to the invention.

The above-defined control architecture according to the invention or the alternative control architecture according to the invention represents an architecture which is suitable for carrying out the method according to the invention or the alternative method according to the invention.

A first refinement of the control architecture according to the invention provides that at least one actuator, preferably each actuator, has a (selection) logic connected upstream, to which reference was already made in the course of the method or a corresponding design thereof. This logic can be designed to select the manipulated variable signal to be used to activate the actuator or, with reference back to the alternative embodiment of the control architecture according to the invention, to generate it.

Another refinement of the control architecture according to the invention provides that the controllers have integral components, which was also already mentioned above.

Still another refinement of the control architecture according to the invention provides that each controller is designed to activate or deactivate its integral component in dependence on a reception of manipulated variable signals having a higher priority ranking than its own priority ranking. It has already been noted that a controller which does not receive manipulated variable signals having a higher priority ranking than its own can presume that it is in a closed loop, and it will preferably activate its integral or integrative components accordingly.

Still another refinement of the control architecture according to the invention provides that the controllers have a communication connection among one another and/or the controllers have a communication connection to the actuators via point-to-point connections in pairs. An alternative refinement of the control architecture according to the invention can provide that the controllers have a communication connection among one another and/or the controllers have a communication connection to the actuators via at least one bus structure. Accordingly, in the first case the communication takes place in a targeted manner between a receiver and a transmitter, while in the second case the manipulated variable signals are transmitted to all controllers or all actuators or to specific selected subgroups, if reasonable.

One particularly advantageous refinement of the control architecture according to the invention provides that the controllers are designed as independent processor units, as CPUs, as Field Programmable Gate Arrays (FPGA), as Programmable Logic Devices (PLD), by the use of a multicore CPU, as a combination of FPGA and CPU, or as Application Specific Integrated Circuits (ASIC). Corresponding combinations are also possible, for example, a combination made up of FPGA and CPU, as in a System-on-a-Chip (SoC). A person skilled in the art knows corresponding types of implementation and will select suitably as needed.

It was already noted above in the scope of the method according to the invention that an optional refinement can provide a feedback channel. A corresponding embodiment of the control architecture according to the invention thus provides that in addition at least one feedback channel is provided for feedback about the reception of a manipulated variable signal by a receiving controller to a transmitting controller. In this way, the failure of specific redundancies may be recognized, which can be advantageous in specific applications.

BRIEF DESCRIPTION OF THE DRAWINGS

Further properties and advantages of the invention result from the following description of exemplary embodiments on the basis of the drawings.

DETAILED DESCRIPTION

Figure 2:
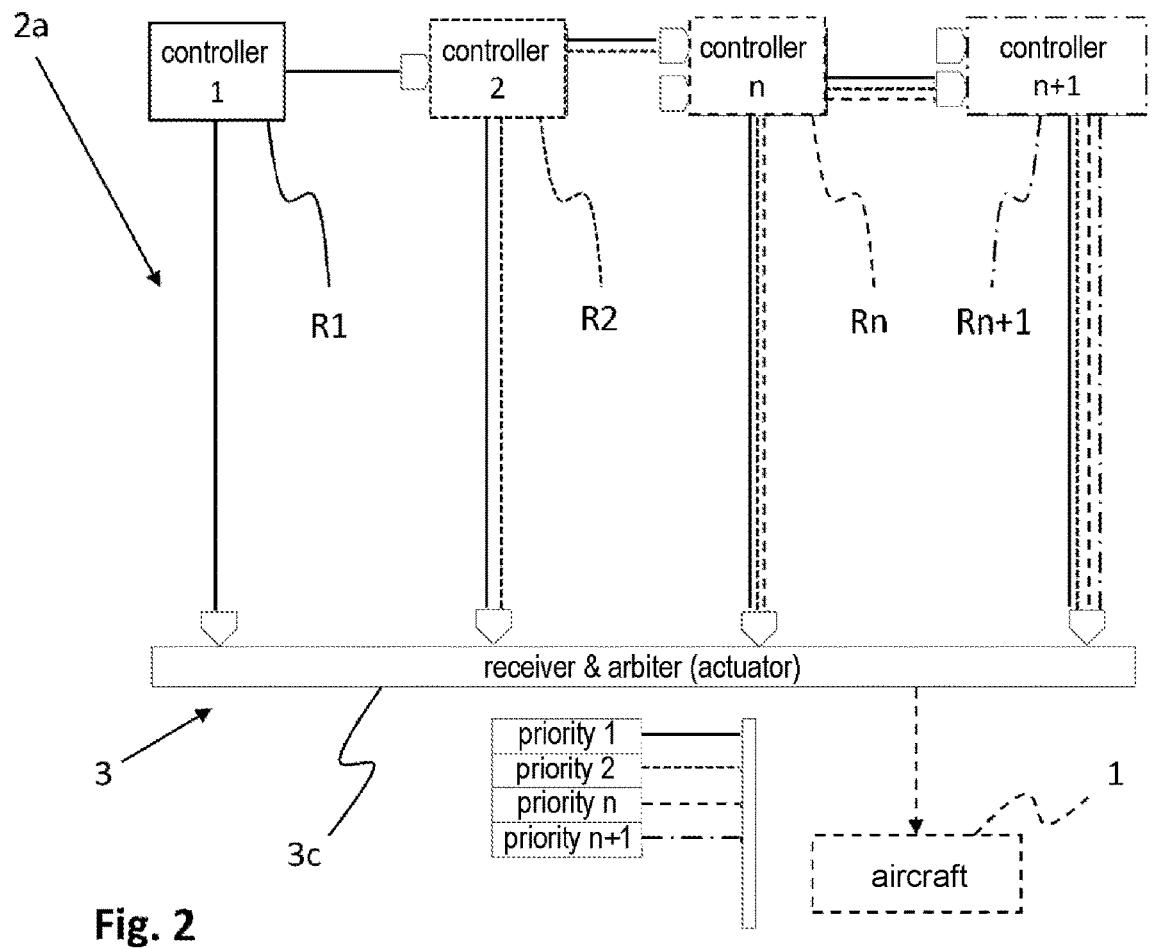
FIG. 2 schematically shows a control architecture according to the invention.

FIG. 2 shows a possible embodiment of the control architecture according to the invention, which is identified as a whole—with reference to FIG. 3 described hereinafter—with the reference sign 2a. Reference sign 1 in FIG. 2 identifies an aircraft (only shown schematically), which is also explained in more detail hereinafter on the basis of FIG. 3. An actuator in the form of a drive unit is shown as an example at reference sign 3, which is also discussed in more detail hereinafter. Reference sign 3c identifies a receiver part of the actuator 3, which receiver part can also be designed as a selection logic (arbiter) or can comprise such a selection logic.

Furthermore, a number of controllers are shown in FIG. 2, in the present case n+1 controllers, which are accordingly identified by the reference signs R1, R2, . . . Rn, Rn+1. In FIG. 2, only a single actuator is shown at reference sign 3, although the aircraft 1 will generally have a plurality of actuators (for example in the form of drive units, cable winches, etc.). In the case of the Volocopter® aircraft from the company of the applicant, the aircraft 1 especially has 18 such drive units or actuators 3 and three controllers, wherein the number of the controllers is independent of the number of the actuators.

Figure 1:
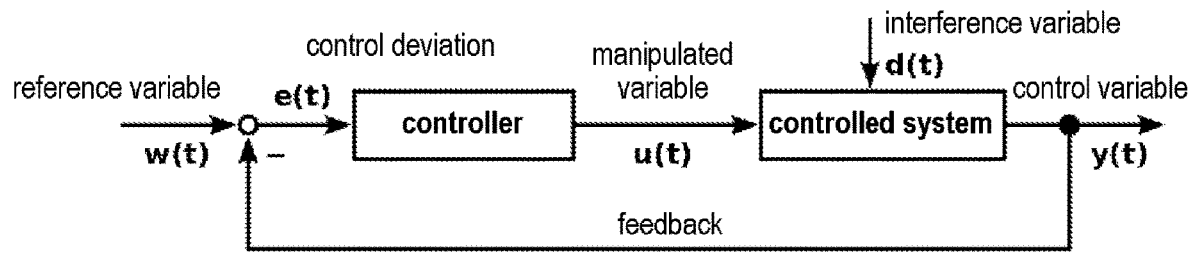
FIG. 1 shows a generally known embodiment of a control architecture according to the prior art.

The controller R1 having the highest priority forms, via the actuator 3, a control loop with the aircraft, as is shown in principle in FIG. 1 and was explained on the basis of this figure. However, according to the invention—at least according to the embodiment in FIG. 2—the feedback shown in FIG. 1 is omitted. FIG. 2 is accordingly applied 18 times in the above-mentioned Volocopter® aircraft (individually for each actuator or each drive unit).

According to FIG. 2, the highest-ranking controller 1 R1 (the controller having the highest priority ranking) generates a manipulated variable signal and transmits it, on the one hand, to the actuator 3 and, on the other hand, to the controller 2 R2, i.e., the controller having the successive priority ranking. This is shown in each case in FIG. 2 by solid lines. Controller 2 R2 also generates a manipulated variable signal for the actuator 3 and transmits this manipulated variable signal, which is shown in FIG. 2 by a dotted line, together with the received manipulated variable signal of the controller 1 R1 both to the actuator 3 and also to the successive controller in the prioritization, in the present case the controller n Rn. The controller n Rn also generates a manipulated variable signal for the actuator 3 and transmits this manipulated variable signal together with the signals received by controller 2 R2 both to the actuator 3 and also to the successive controller n+1 Rn+1. The latter controller Rn+1 thus receives three manipulated variable signals from the preceding controllers R1 to Rn (from controller n Rn) and then transmits four manipulated variable signals to the actuator 3—namely the three manipulated variable signals received by controller n Rn and the manipulated variable signal it generates itself. The manipulated variable signals from controller n Rn are shown by dashed lines in FIG. 2, while the manipulated variable signal from controller n+1 Rn+1 is shown by a dot-dash line. This concept may be applied to arbitrarily many controllers.

As also shown in FIG. 2 (bottom), the controllers R1 to Rn+1 are ranked according to their priorities, wherein controller 1 R1 has the highest priority ("priority 1") and controller n+1 Rn+1 has the lowest priority ("priority n+1"). The actuator 3 or the receiver/arbiter 3c always selects the applied manipulated variable signal which has the highest priority for its activation. If one of the controllers R1-Rn+1 does not receive manipulated variable signals from controllers having a high priority, which is only the case for controller 1 R1 according to FIG. 2, it knows that it is in a closed loop and will activate its integrative components accordingly. If controller 1 R1 were to fail, this would similarly be the case for controller 2 R2, as in the case of impairment of the relay from R1 to R2.

In the last-mentioned case, the actuator 3 would still implement the signal from controller 1 R1. For controller 2 R2 and all other controllers in the open loop, a suitable anti-windup strategy is implemented so that the aircraft 1 still remains stable for the case that controller 1 R1 actually fails (and controller 2 R2 is selected by the actuator 3).

The anti-windup strategy is suitable in these terms if the control output which results due to the windup does not have the result upon the switchover that the aircraft becomes unstable, but rather still remains able to be stabilized by the now active controller.

In addition, the controller is also not permitted to leave the defined "envelope" in the transition because this is assessed as a significant error in aviation and under certain circumstances can even end catastrophically.

The actuator 3 acts on the aircraft 1 according to the dashed arrow in FIG. 2 and can influence its (flight) behavior in this way too.

The described architecture 2a ensures that the actuator 3 always implements the manipulated variable signal of the controller 1 R1 as long as this controller is not completely cut off from the control loop (disappearance of both solid connections) or fails entirely.

In the following, the control sequence is described once again comprehensively on the basis of FIG. 2:

The controller having the highest priority transmits the desired manipulated variable signals to at least two receivers. The first receiver is the actuator 3 or the upstream logic (arbiter) 3c. This is designed to select, following a logic, the manipulated variable signal to be implemented from all received manipulated variable signals. In particular, this can be the manipulated variable signal of the controller having the highest priority. The second receiver is the controller having the next higher priority, in relation to controller 1 R1, thus, for example, controller 2 R2 etc. In addition, the manipulated variable signals can also be transmitted directly to all further controllers or a subset of all further controllers, which is not thus shown in FIG. 2.

It has already been noted that the transmission can take place point-to-point or that it can go simultaneously to all receivers by way of a bus architecture.

The controller having the next higher priority, in relation to the controller 1 R1 thus the controller 2 R2, now receives the manipulated variable signals of all controllers of higher priority (only controller 1 R1 here) and has the task of relaying these signals together with the manipulated variable signals it calculates itself to the relevant actuators 3. It is presumed here in accordance with the explanation given above that each controller generally does not only activate one actuator 3, as shown in FIG. 2, but rather a plurality of actuators. The manipulated variable signals are thus relayed to the actuator 3 or the receiver/arbiter 3c and to all controllers having a lower priority, that is to say in the illustration according to FIG. 2 to all controllers to the right of a given controller. In this way, it is ensured that whenever a manipulated variable signal arrives at the actuator 3, the manipulated variable signal of the controller having the highest priority also arrives at the actuator 3, as long as this controller, in the present case thus the controller 1 R1, transmits manipulated variable signals via one of the two channels (channel controller-actuator or channel controller-controller).

As was already mentioned, a controller recognizes that it is in a closed control loop as soon or if it does not receive (or no longer receives) manipulated variable signals from controllers having higher priority. In this way, it is made possible that the relevant controller can activate its integral components.

If controller 1 R1 should be completely cut off or fail, the above view applies for controller 2 R2 as the then effectively highest-priority controller, then furthermore for controller n Rn or controller n+1 Rn+1 similarly.

In this way, each controller can make a statement, even without feedback channel, whether it is in an open or a closed control loop and to switch its integral behavior on or off independently depending thereon. Each controller can make this decision, because it is known to it that or if a manipulated variable signal of a controller having higher priority is no longer available at a controller having lower priority.

The architecture shown in FIG. 2 may preferably be implemented by interconnecting controllers which are designed as independent processor units, CPUs, Field Programmable Gate Arrays (FPGA), Programmable Logic Devices (PLD), or as Application Specific Integrated Circuits (ASIC). Moreover, the controllers or individual controllers can also be implemented by the use of a multicore CPU having corresponding bus or point-to-point communication. A combination of FPGA and CPU, as in a System-on-Chip (SoC), is also possible.

As already mentioned, in FIG. 2 the interconnection of n+1 controllers with one actuator is shown by way of example. In the application of the Volocopter aircraft, the system comprises three controllers and 18 actuators in the form of drive units (electric motors and propellers).

Figure 3:
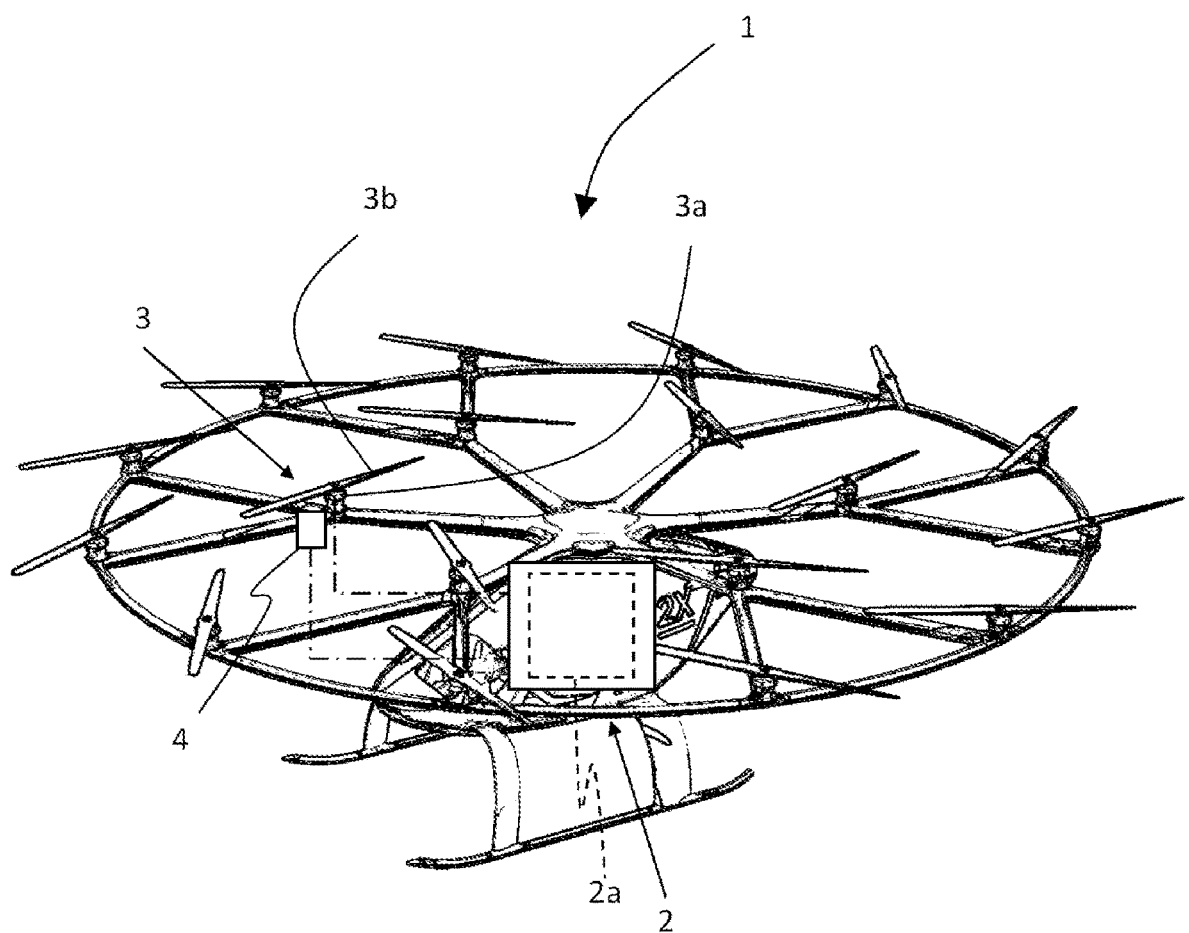
FIG. 3 schematically shows the use of the present invention in a multirotor eVTOL aircraft.

Finally, FIG. 3 shows the use of the control architecture 2a shown in FIG. 2 in an aircraft 1. The aircraft 1 is designed as a multirotor eVTOL aircraft and has 18 actuators in the form of drive units 3, which each comprise an electric motor 3a and a rotor or propeller 3b; this is only shown explicitly for a single actuator 3 in FIG. 3 for reasons of clarity.

Moreover, each actuator 3 can be operationally connected to at least one sensor 4, which is provided for metrological monitoring of the actuator 3, as described by way of example in the introduction.

The control architecture 2a is part of a flight control or flight control unit 2, which is on board the aircraft 1. The control architecture 2a can in particular be designed as described in detail above on the basis of FIG. 2, thus correspondingly also comprises the actuators 3 and sensors 4, although this is shown differently in FIG. 3 for reasons of illustration. Accordingly, it acts not only on the one drive unit (actuator) 3 explicitly shown in FIG. 3, but rather on all 18 drive units (actuators) to control or regulate the flight behavior of the aircraft 1 accordingly. Further actuators which are taken into consideration can be, for example, cable winches or the like for load transport (not shown). A payload itself (also not shown) or a tool can also have properties which are metrologically acquired and incorporated into the flight control. Actuators for activating aerodynamic surfaces can also likewise be taken into consideration by the described method or the described control architecture, which can be embodied both electrically and also hydraulically.

In the context of another embodiment of the present invention, it is also possible to provide a topology made up of multiple buses and point-to-point connections instead of the architecture shown by way of example in FIG. 2, which fundamentally implements the same information flow as shown in FIG. 2, however. Such an embodiment is also in the scope of the present invention.

The invention claimed is:

1. A control architecture for an aircraft, the control architecture comprising:
multiple distributed actuators;
a plurality of controllers;
wherein each controller of the plurality of controllers is configured to determine and generate a respective manipulated variable signal,
wherein each controller of the plurality of controllers is assigned a respective priority ranking, each of the respective priority rankings being different and ranging successively between highest and lowest priorities,
wherein each controller of the plurality controllers has a signaling connection to a subset of the actuators,
wherein each controller is configured to transmit the respective manipulated variable signal of said controller to the subset of the actuators,
wherein each controller of the plurality of controllers, except the controller having the respective priority ranking of the lowest priority, is configured to transmit the respective manipulated variable signal of said controller to the controller having the successively lower priority ranking with respect to the respective priority ranking assigned to said controller,
wherein each controller of the plurality of controllers, except the controller having the respective priority ranking of the highest priority, is configured to receive the respective manipulated variable signal(s) generated by each of the controller(s) that are assigned higher priority rankings than the respective priority ranking assigned to said controller,
wherein each controller of the plurality of controllers, except the controller having the respective priority ranking of the highest priority, is configured to relay the received manipulated variable signal(s) to the subset of the actuators and to the controller having the successively lower priority ranking with respect to the priority ranking assigned to said controller, and
the subset of the actuators is configured to select the respective manipulated variable signal generated by the controller having the respective priority ranking of highest individual priority with respect to all the respective manipulated variable signals transmitted and relayed to the subset of actuators for activation thereof.

2. The control architecture as claimed in claim 1, wherein the subset of the actuators is configured to select the respective manipulated variable signal generated by the controller having the respective priority ranking of highest individual priority with respect to all the respective manipulated variable signals transmitted and relayed to the subset of actuators for activation thereof via an arbiter.

3. The control architecture as claimed in claim 1, wherein each of the controllers have integral components.

4. The control architecture as claimed in claim 3, wherein each of the controllers is configured to activate or deactivate the integral components thereof.

5. The control architecture as claimed in claim 1, wherein at least one of (a) the controllers have a communication connection among one another or (b) the controllers have a communication connection to the actuators via point-to-point connections in pairs.

6. The control architecture as claimed in claim 1, wherein at least one of (a) the controllers have a communication connection among one another or (b) the controllers have a communication connection to the actuators via at least one bus structure.

7. The control architecture as claimed in claim 1, wherein the controllers are configured as independent processor units, CPUs, Field Programmable Gate Arrays (FPGA), Programmable Logic Devices (PLD), or by a multicore CPU, a combination of FPGA and CPU, or as Application Specific Integrated Circuits (ASIC).

8. The control architecture as claimed in claim 1, further comprising at least one feedback channel.

9. The control architecture as claimed in claim 1, wherein the aircraft is an electrically driven vertical takeoff and landing multirotor aircraft, the actuators comprise drive units.

10. The control architecture as claimed in claim 1, wherein the priority ranking of the controllers is performed by a priority list, and in the priority list the controllers are listed in a sequence of their priority ranking.

11. An aircraft comprising the control architecture of claim 1.

12. The aircraft of claim 11, wherein the aircraft is an electrically driven, vertical takeoff and landing multirotor aircraft, and the actuators comprise drive units.

* * * * *